United States Patent
Vines et al.

(10) Patent No.: US 10,528,956 B2
(45) Date of Patent: Jan. 7, 2020

(54) PUBLIC AND PRIVATE ROAD SAFETY AND ADVERTISING MEDIUM

(75) Inventors: Duce Vines, Westlake Village, CA (US); Alton Woods, Van Nuys, CA (US)

(73) Assignees: Duce Vines, Westlake Village, CA (US); Alton Woods, Van Nuys, CA (US)

( * ) Notice: Subject to any disclaimer, the term of this patent is extended or adjusted under 35 U.S.C. 154(b) by 400 days.

(21) Appl. No.: 12/561,043

(22) Filed: Sep. 16, 2009

(65) Prior Publication Data
US 2010/0131370 A1 May 27, 2010

Related U.S. Application Data

(63) Continuation-in-part of application No. 11/081,801, filed on Mar. 16, 2005, now abandoned.

(60) Provisional application No. 60/569,894, filed on May 10, 2004, provisional application No. 60/553,822, filed on Mar. 16, 2004.

(51) Int. Cl.
*G06Q 30/02* (2012.01)
*G06Q 99/00* (2006.01)

(52) U.S. Cl.
CPC ......... *G06Q 30/02* (2013.01); *G06Q 30/0273* (2013.01); *G06Q 99/00* (2013.01)

(58) Field of Classification Search
CPC .... G06Q 30/00; G06Q 30/02; G06Q 30/0241; G06Q 30/0273

USPC ......... 705/14; 340/908.1; 428/98, 40.1, 142; 40/584, 624, 500; 404/72
See application file for complete search history.

(56) References Cited

U.S. PATENT DOCUMENTS

| | | | | |
|---|---|---|---|---|
| 1,930,018 | A | * 10/1933 | Norman | 40/624 |
| 5,878,516 | A | 3/1999 | Amirian et al. | |
| 5,947,635 | A | * 9/1999 | Wilson, Sr. | 404/72 |
| 6,020,073 | A | 2/2000 | Wilson, Sr. | |
| 6,041,533 | A | * 3/2000 | Lemmond, Jr. | 40/584 |
| 6,511,214 | B1 | 1/2003 | Reeves et al. | |
| 6,908,653 | B2 | * 6/2005 | Keane | 428/40.1 |
| 6,914,540 | B2 | * 7/2005 | Gongolas | 340/908.1 |
| 7,045,193 | B2 | * 5/2006 | Tanel et al. | 428/142 |
| 2001/0037280 | A1 | * 11/2001 | Ingraham et al. | 705/37 |
| 2003/0152744 | A1 | * 8/2003 | Arena | 428/98 |
| 2004/0083132 | A1 | * 4/2004 | Gotfried | 705/14 |
| 2004/0197548 | A1 | 10/2004 | Kopystecki | |
| 2005/0004836 | A1 | * 1/2005 | Ruttenberg | 705/14 |
| 2005/0149398 | A1 | * 7/2005 | McKay | G06Q 30/02 705/14.65 |
| 2005/0229451 | A1 | * 10/2005 | Mullens et al. | 40/500 |
| 2008/0154728 | A1 | * 6/2008 | Thomas | 705/14 |
| 2008/0294487 | A1 | * 11/2008 | Nasser | G06Q 30/02 705/7.32 |

* cited by examiner

*Primary Examiner* — Marilyn G Macasiano
(74) *Attorney, Agent, or Firm* — KPPB LLP

(57) ABSTRACT

The provision of advertising material on ground surfaces is provided. In some embodiments, the advertising material is a thin, nonslip material affixed to a roadway surface. In some embodiments rights relating to the roadway surface are obtained, advertisement material is placed thereon, and revenue is received for having the advertisement material on the roadway. In some embodiments, the revenue is shared with governmental entities.

11 Claims, 9 Drawing Sheets

PUBLIC AND PRIVATE ROAD SAFETY AND ADVERTISING MEDIUM

CROSS-REFERENCE TO RELATED APPLICATION(S)

This is application is a continuation in part of U.S. patent application Ser. No. 11/081,801, filed Mar. 16, 2005 now abandoned which claims the benefit of U.S. Provisional Patent Application Nos. 60/553,822, filed Mar. 16, 2004 and 60/569,894, filed May 10, 2004 both entitled PUBLIC AND PRIVATE ROAD SAFETY AND ADVERTISING MEDIUM, the disclosures of all three applications are hereby incorporated by reference as if set forth in full herein.

BACKGROUND

The invention generally relates to advertisements, and more particularly relates to surface-based advertisements.

The promotion of products, the promotion of services, and the concomitant attempts to influence consumer behavior and purchasing forms a vast advertising industry. The advertising industry determines messages to convey to consumers, the form those messages take, and how those messages are to reach an audience. Often those messages take the form, and are delivered to consumers, as advertisements.

Advertisements are ubiquitous. Advertisements may be found in newspapers, magazines, television broadcasts, web pages, billboards, on banners towed by airplanes, and in a variety of mediums and locations. However, despite the profusion of advertisements, advertisements are not all pervasive, and opportunities to educate, inform, and influence consumers are lost.

SUMMARY

In one embodiment, a method of marketing outdoor ground-surface advertising for a ground-surface, comprises leasing a portion of a ground-surface area of an entryway from an entity having rights in the entryway for the use of placement of advertising on such leased portion of ground-surface area; marketing and re-selling a right to use the leased portion of the ground-surface area of the entryway for the placement of advertising artwork to an advertiser for a specified period of time; and installing the advertising artwork at the location of the leased ground-surface area of the entryway.

In one embodiment, a system of marketing outdoor ground-surface advertising for a ground-surface comprises a database and a server. The database includes a plurality of records comprising at least one location for placement of ground-surface advertising and property owner criteria for the at least one location, the at least one location being a leased entryway of a ground-surface area. The server is coupled to the database and configured to receive a user criteria to query the database and transmit location results based on the received user criteria matching the property owner's criteria.

Many of the attendant features of the present invention will be more readily appreciated as the same becomes better understood by reference to the foregoing and following description and considered in connection with the accompanying drawings in which like reference symbols designate like parts throughout.

DETAILED DESCRIPTION

Figure 1:
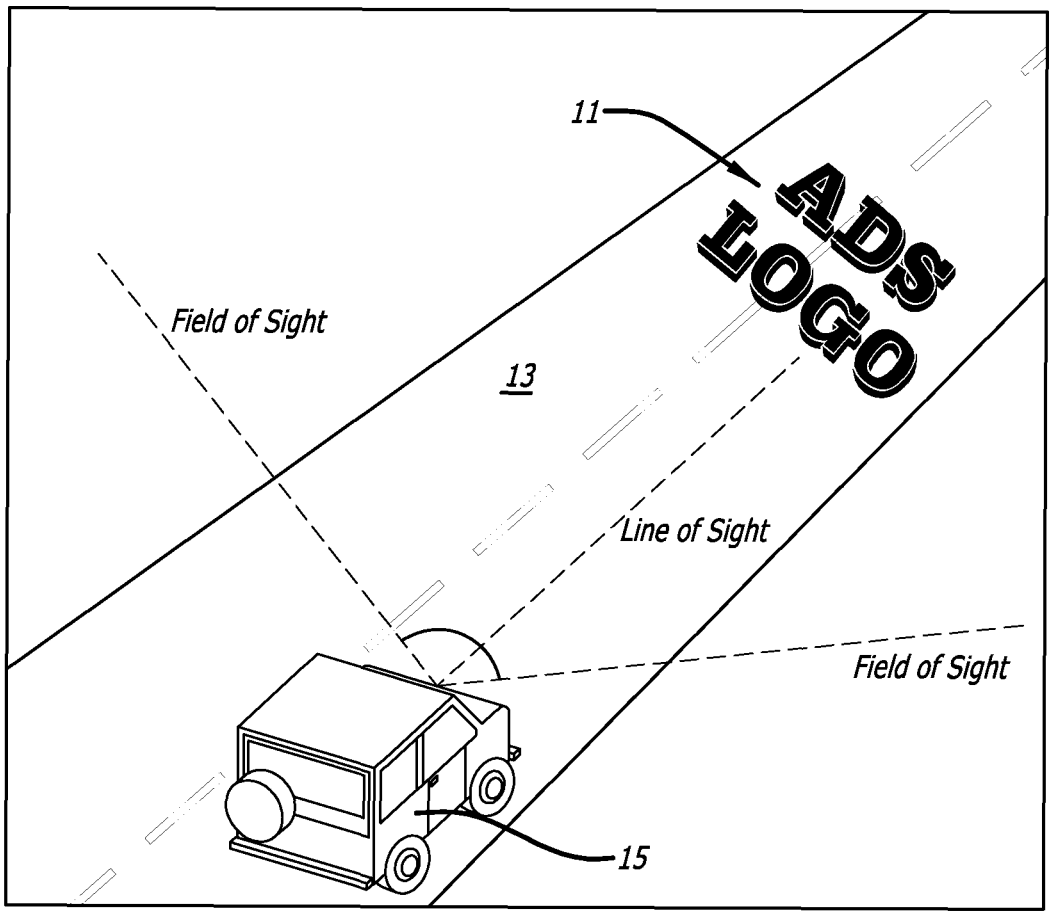
FIG. 1 illustrates an advertisement located in a roadway.

FIG. 1 illustrates an advertisement 11 on a roadway 13. As illustrated, the roadway is a two lane roadway. Also as illustrated, the advertisement comprises textual material placed on the roadway, although in some embodiments the advertisement is placed within the roadway. The textual material is placed in a sequential fashion along a path of the roadway. Accordingly, the advertisement is viewable by occupants of an automobile 15 driven on the roadway, and particularly by a driver of the automobile, whose attention is naturally focused on the roadway. Indeed, the advertisement is viewable by the driver without requiring the driver to avert his or hers eyes from the roadway. In addition, the advertisement may be viewable by others not in vehicles, such as pedestrian 15 or those otherwise approximate the roadway.

Figure 2:
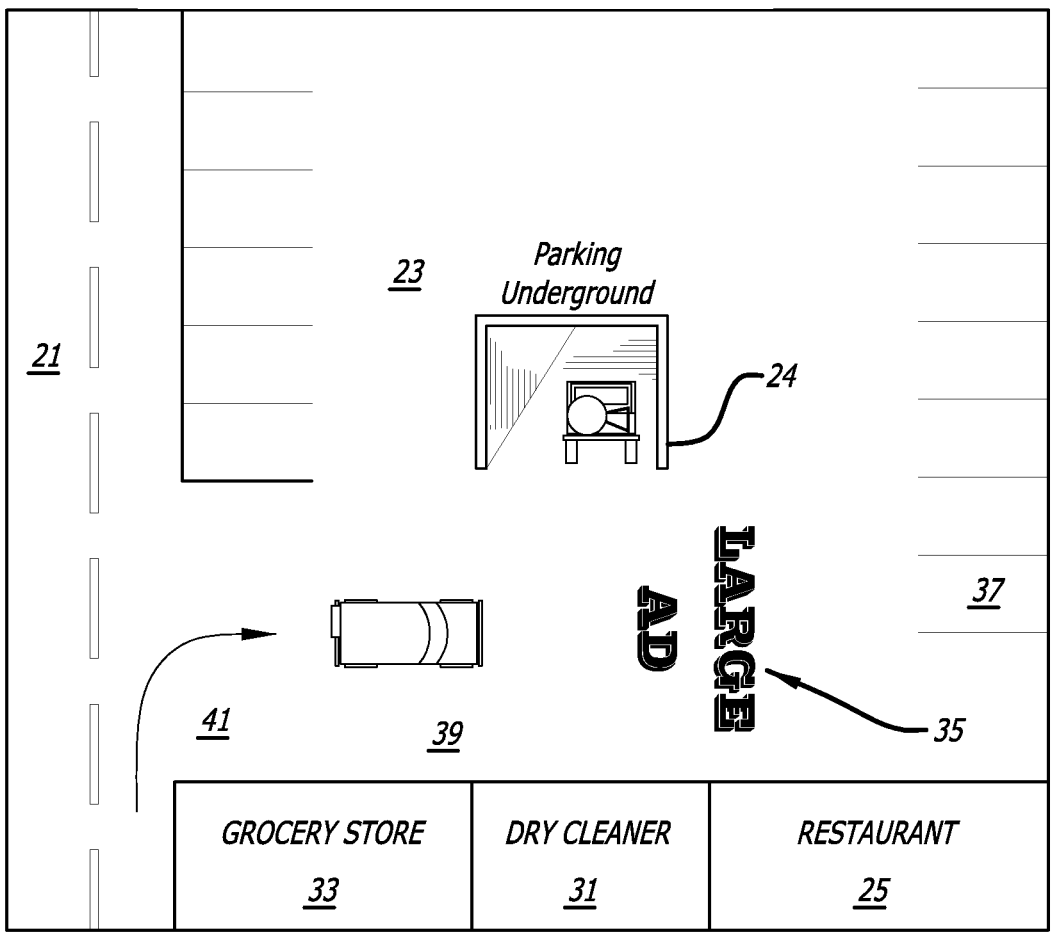
FIG. 2 illustrates a road side shopping area with parking lot having an advertisement on the parking lot surface.

FIG. 2 illustrates an aerial view of a commercial area. As illustrated the commercial area is approximate a roadside 21, and may be considered to be of the type sometimes referred to as a strip mall. As is common with such commercial areas, the commercial area includes a vehicle parking lot 23 accessible from the roadway. Commercial establishments are located along at least some of the edges of the parking lot. The commercial establishments, as illustrated in FIG. 2 includes a variety of commercial establishments, such as restaurants 25,27, a coffee shop 29, a dry cleaner 31, and a grocery store 33.

An advertisement 35 is placed on, or embedded within, the surface of the parking lot. In the embodiment shown the advertisement is outside a parking area 37 of the parking lot. Instead, the advertisement is located in a driving path area 39 of the parking lot. Accordingly, occupants, and particularly drivers, of vehicles traversing the parking lot, for example seeking an available parking space, may view the advertisement, and the vehicle may pass over the advertisement. The advertisement of FIG. 2 is a public service announcement, being in the form of an encouragement to vote in an election.

Conveniently, the advertisement is positioned in relation to an entrance 41 to the parking lot such that occupants of a majority of vehicles entering the parking lot through the entrance may view the advertisement.

Figure 3:
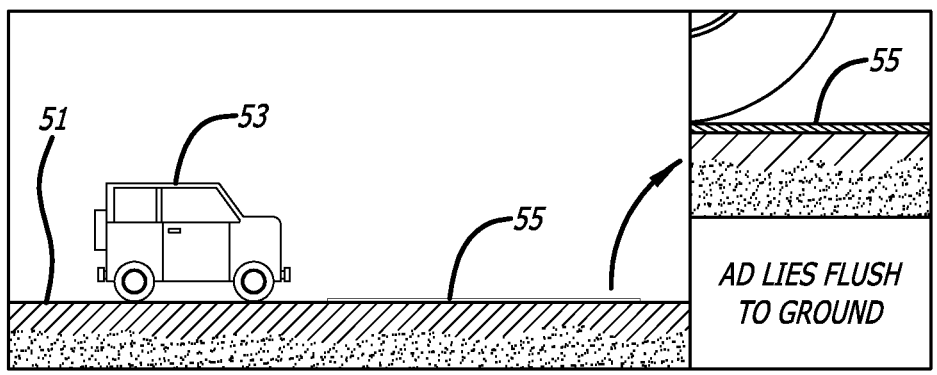
FIG. 3 illustrates a cross-sectional view of an advertisement placed on the ground.

FIG. 3 illustrates a cross-sectional view of a surface 51 suited for vehicular access. For descriptive purposes an automobile 53 is shown on the surface. An advertisement 55 is positioned on the surface. As may be seen in the exploded view of the cross-section, the advertisement lies upon the surface and is substantially flush with the surface.

Figure 4:
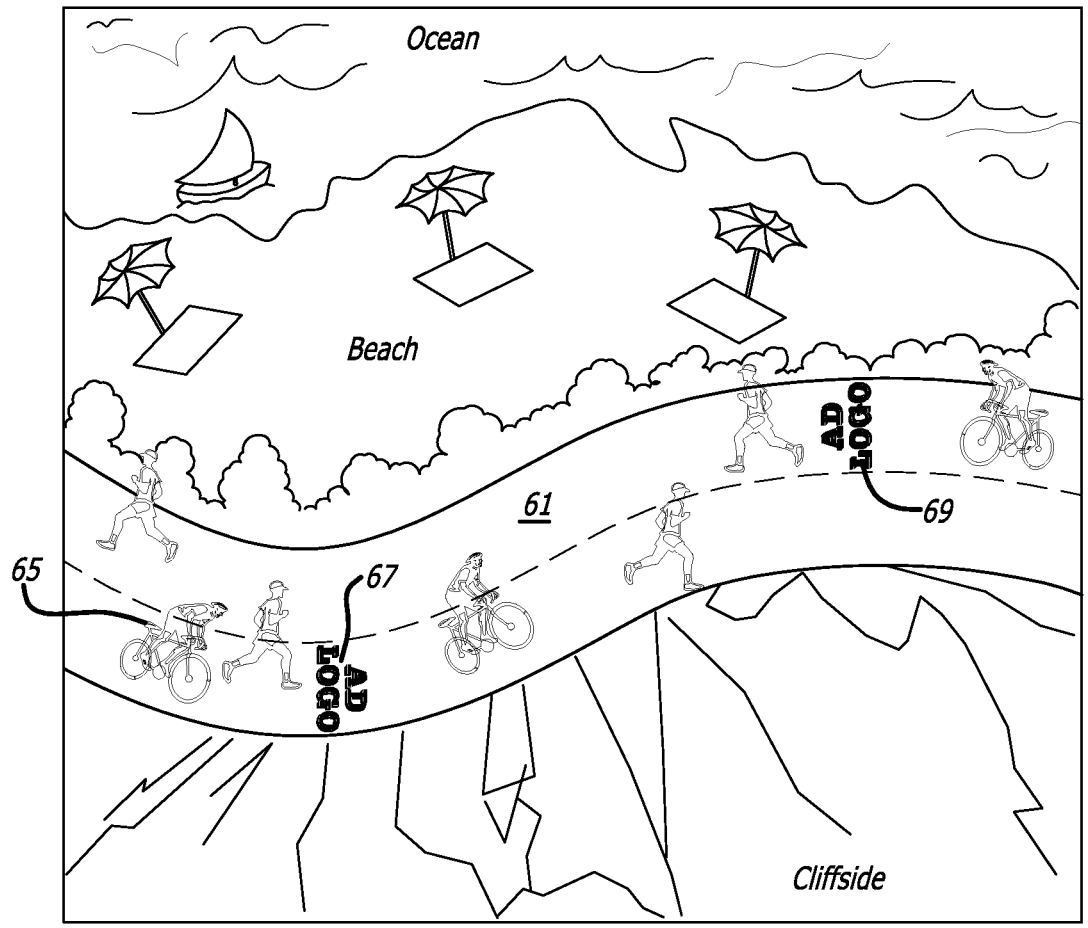
FIG. 4 illustrates a beach side path including advertisements.

FIG. 4 illustrates a path 61 along a beach 63. The path is of the type sometimes referred to as a bike path, and is common in some beach locales. A bicyclist 65 is bicycling along the path. A first advertisement 67 is on one portion of the path. As illustrated, the first advertisement is on the right hand side of the path, as viewed by the bicyclist. The first advertisement is also positioned for viewing in proper orientation by those having a direction of travel according to a drive-on-right roadway system. As illustrated, the bicyclist is traveling on the path according to such a system of travel, and the bicyclist will encounter what could be considered a bottom of the first advertisement and then pass over the advertisement as the bicyclist travels along the path.

A second advertisement 69 is on a second portion of the path. The second advertisement is on an opposing side of the path compared to the first advertisement, and, in terms of the bicyclist, the second advertisement is on the left hand side of the path. The second advertisement is oriented with respect to the path opposite to the orientation of the first advertisement. Thus, to the bicyclist, the second advertisement appears upside-down. To a further bicyclist having an opposite direction of travel, however, the second advertisement is properly oriented for viewing.

Figure 5:
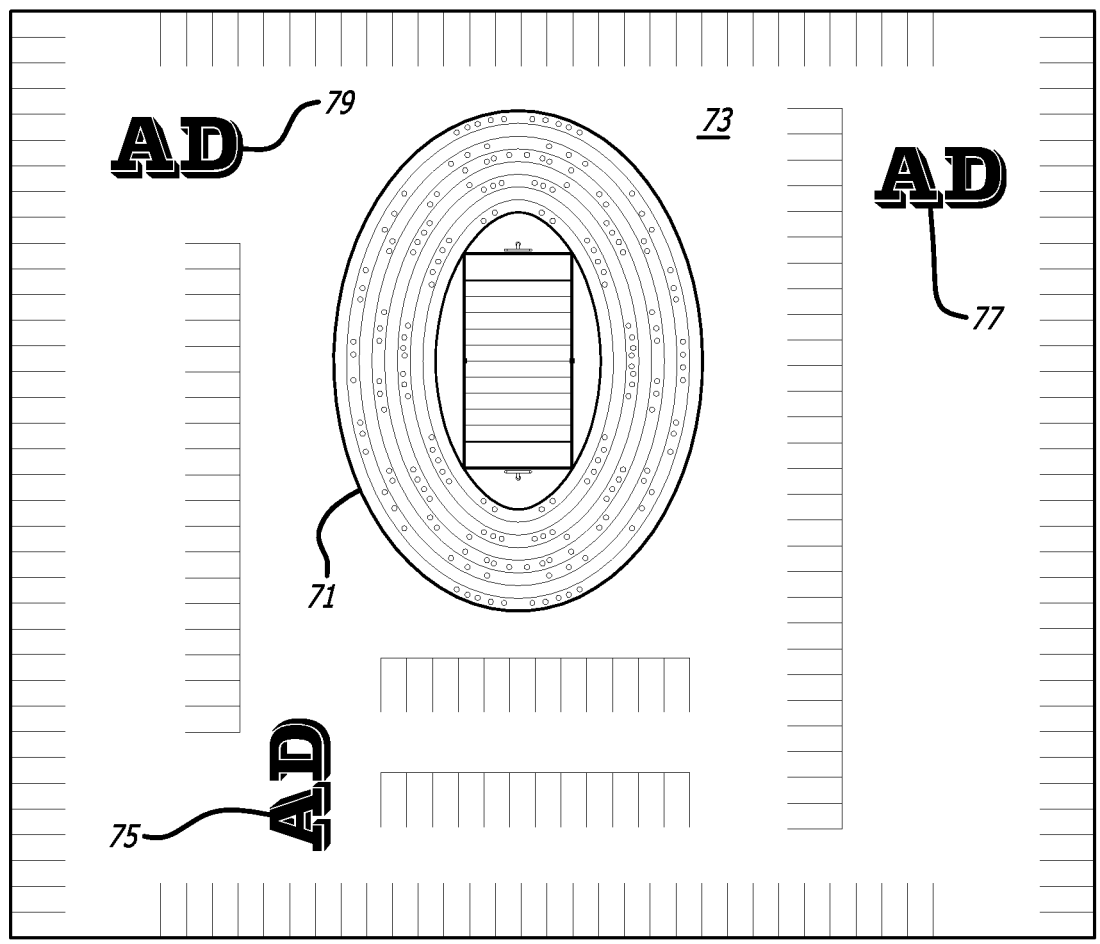
FIG. 5 illustrates a sport venue and associated parking lot including advertisements on the parking lot.

FIG. 5 illustrates a stadium venue including associated parking area. The stadium venue includes a stadium 71 and a parking area 73 approximate the stadium. As illustrated the parking area largely surrounds the stadium, although in various venues placement of the parking area varies with respect location of the stadium.

Advertisement material is located on the surface of the parking area. The advertisement material includes a first advertisement 73, a second advertisement 75, and a third advertisement 77. The advertisements are located on portions of the parking area not generally used for parking. The advertisements are also sized so as to be visible from airborne observers, such as those in airplanes and blimps. More particularly, as illustrated the advertisements are sufficiently large so that the advertisements may be discerned in an aerial view of the stadium, such as might be transmitted by a television broadcaster.

In some embodiments advertisements are also place on areas of the parking area generally used for parking. For example, in some embodiments some or all of the parking spaces each have there own advertisement material placed thereon. In other embodiments advertisement material may cover portions of several parking spaces, or an entire subarea of a parking area.

Figure 6:
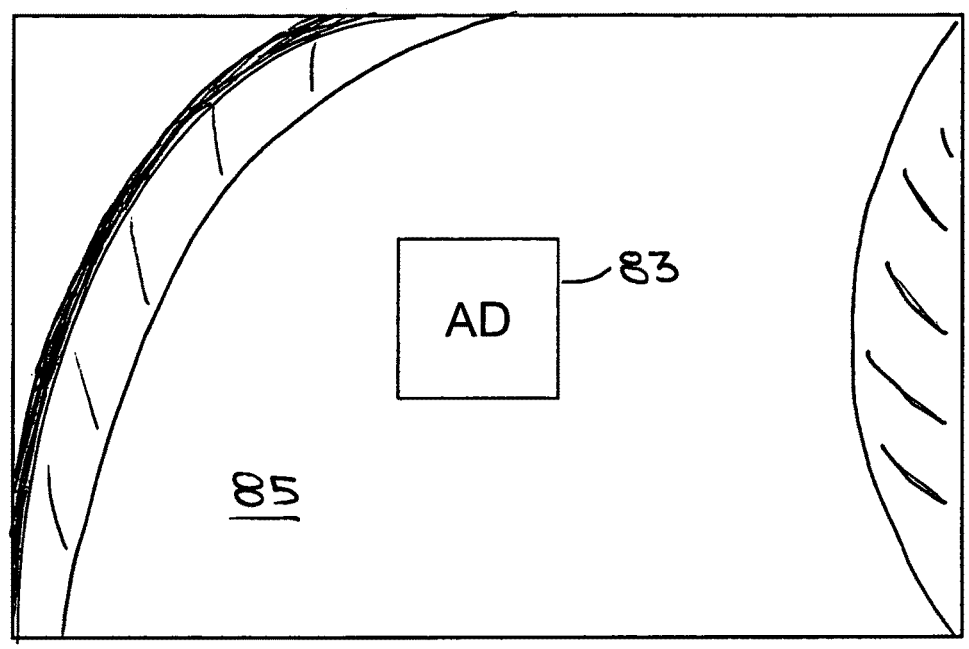
FIG. 6 illustrates a walkway of a venue such as a sporting stadium, arena, or hall with an advertisement on the floor.

FIG. 6 illustrates a hallway 81 including advertising material 83 on the floor 85 of the hallway. The floor of the hallway provides a pedestrian walkway, in this case an indoor pedestrian walkway. In other embodiments pedestrian walkways may be outdoor, and may include dual use surfaces such bike paths. In further embodiments pedestrian walkways may be jogging trails, or jogging or running tracks. The advertising material is a thin, non-slip surface affixed, generally temporarily, to the walkway surface.

Figure 7:
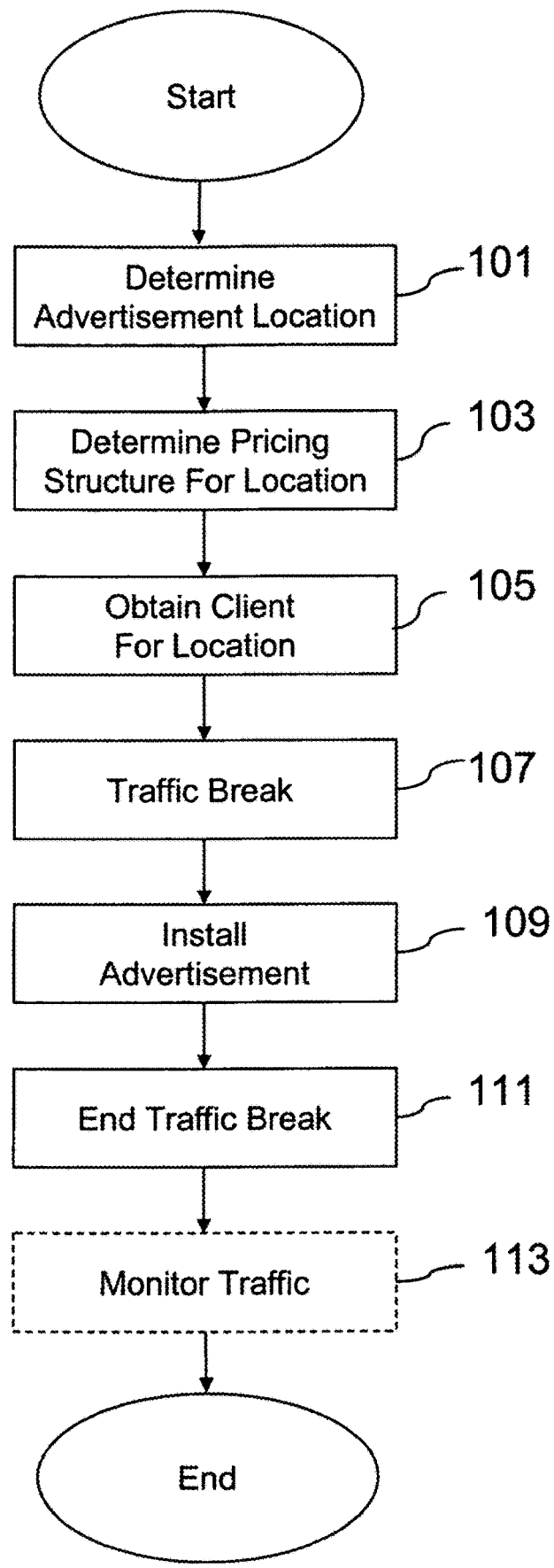
FIG. 7 is a flow diagram of a process in accordance with aspects of the invention.

In some embodiments the process of FIG. 7 is used in connection with the foregoing. In block 101 a location for a billboard alternative is determined. The location is, in some embodiments, on a route of travel, including vehicular routes of travel. In block 103 a pricing structure for the location is determined. The pricing structure may, for example, be based on numbers of persons or vehicles using the route of travel. In block 105 a client is obtained for the location. In block 107 a traffic break is formed at the location. The traffic break prevents traffic, such as vehicular traffic, from moving over the location. In block 109 a billboard alternative is installed at the location. In block 111 a traffic break is ended.

In some embodiments pricing for the billboard alternative at the location may be based on events subsequent to placement of the billboard alternative at the location. For example, pricing may be based on a number of vehicles using the traveled route, and variations thereof to account for times at which the billboard alternative is not visible due to very heavy traffic. Accordingly, in block 113 traffic over the travel route is monitored.

In some embodiments revenue is allocated between a marketer or reseller of rights to place advertisements on the roadways and an underlying rights holder.

Figure 8:
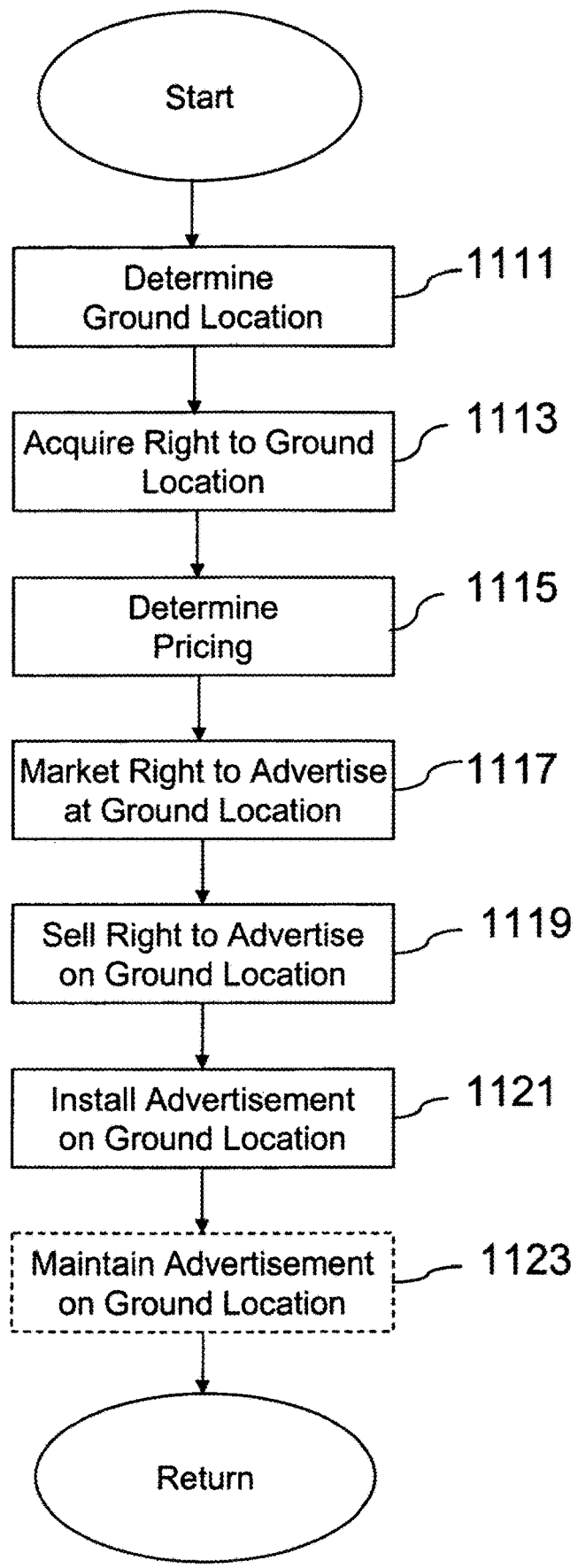
FIG. 8 is a flow diagram of a further process in accordance with aspects of the invention.

FIG. 8 is a flow diagram of an alternate process used in connection with some of the foregoing embodiments. In block 1111 a ground location is determined. The ground location, for example, may be a roadway, a parking area, a walkway, or other ground surface. Generally, the ground surface will be an outdoor ground surface. In block 1113 a right to the ground location is acquired. Generally the right acquired is the right to place an advertisement on the surface of the ground location. In some embodiments the right is in the form of a lease for a specified period of time, which may or may not be contingent upon other circumstances. In some embodiments the rights are acquired from an underlying rights holder, such as city, state or other government entity having rights in the roadway, or a private property owner having rights, whether as lessee or owner, to parking garages, convenient store parking lots, or the like. In block 1115 pricing is determined for the placement of advertisements on the ground location. In block 1117 a right to advertise at the ground location is marketed to advertisers and other parties. In block 1119 the rights to advertise in the location are sold to, for example, an advertiser. In some embodiments, the marketing and sale of the right may take the form of marketing and contracting to place an advertisement on the ground location for the party. In block 1121 an advertisement is placed on the ground location. In block 1123, optionally, the advertisement of the ground location is maintained. Additionally, in some embodiments, revenue received from placement or location, or maintenance of the advertisement on the ground location is allocated or shared between an underlying rights holder in the ground location and a marketer of a right to advertise at the ground location.

Figure 9:
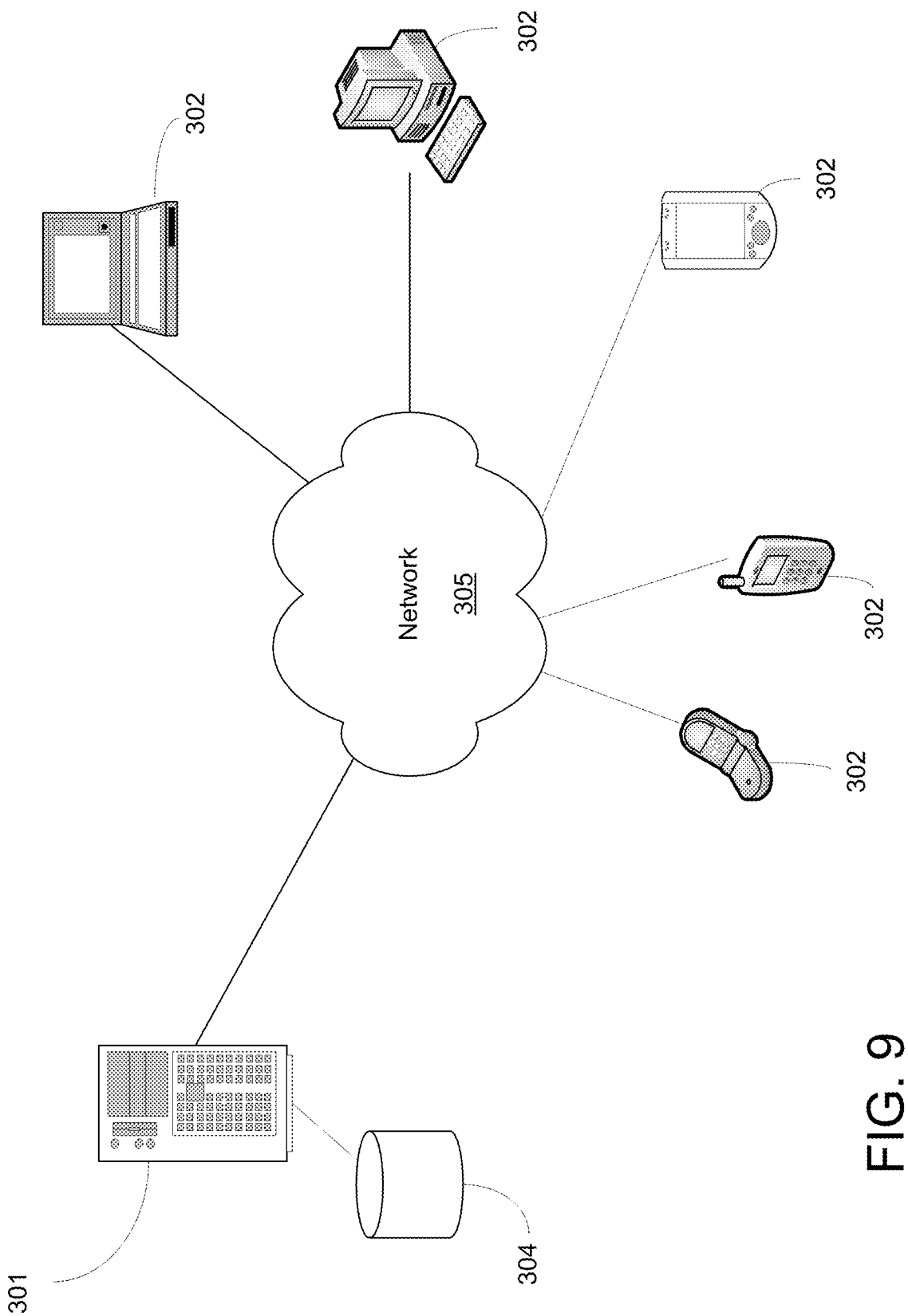
FIG. 9 is a system diagram of one embodiment of an advertising system in accordance with aspects of the invention.

The processes described throughout the application can be implemented via the system shown in FIG. 9. In one embodiment, the advertising system comprises one or network capable (via wireless or wired) computing devices 302 such as client computers or mobile phones that enable one or more advertisers or users to manage and/or select their specific advertising campaigns. These campaigns includes locations, spaces and/or advertising spots that the ground-work advertisements will be located and for the duration that the advertisement will remain. Along with the ability to manage and control the frequency, length, duration, time, number of locations and/or number of people that will be exposed to the advertisement, the advertiser can manage what image or advertisement that is to be used. For example, in one embodiment, by utilizing a database 304 coupled to or incorporated into a server 301 to upload specific image or images that then can be used for a single or for multiple ground-work advertisements. In one embodiment, the uploaded image or images are incorporated into a non-slip thin advertising material to be affixed to the ground space to form the ground-work advertisement.

By using a network 305, e.g., the Internet, and/or directly interfacing with the server, the advertiser (user) can log onto or into the database using their account information/user login. The user can then build their campaign and tailor the number of locations, spaces and/or advertising spots and number of different images for their campaign and what image or advertisement goes to what location, spaces and/or advertising spots that they would choose. In one embodiment, the server receives the user criteria generated by the user budding their campaign to query the database and transmit location results based on the received user criteria matching a location's criteria and/or a property owner's criteria. Furthermore, through the server and database, the user has the ability to create an accurate quotation or proposal for what their campaign would cost along with creating a work order, starting date based upon availability for the individual campaign, billing cycle for their account receivable and their account payable to the third party provider, along with automated invoicing and automated bill payment processes to the third party provider. Additionally, through the server and database, the user can build a campaign to advertise their image of choice to any of our thousands of locations across one or more geographical locations throughout the world. The user is also able to view their actual advertisement through the server and database of "proof of performance" capabilities to see each individual advertisement to verify that the advertisement has been placed at the appropriate location via for example a picture or video of the advertisement once it has been placed. In one embodiment, the database includes a record that corresponds to the location that includes an image of the advertising material affixed to the entryway of the location that verifies the installation of the ground-work advertisement. As such, in one embodiment, a user via a client computer can request the record from the database through the server in which the server retrieves the record and downloads the verification image to the client computer.

In one embodiment, the server can accesses the database to also calibrate all locations, durations, image sizes and remaining property inventory for an audit review. The server via the database also calculates inventory (used and unused), maintains all users, past, present and future campaigns, images used and to be used for retrieval for use in reports, statements, accounting, commissions, accounts payable to property owners and/or sales employees territories. The database in one embodiment also houses the accounts receivables and maintains company profiles of users.

In one embodiment, the advertisement is placed at the entryway of a pedestrian or vehicle path. The entryway advertisement has the maximum ability to reach every person that enters the store or pathway. For example, a person may not see a parking lot placement unless parked in a particular area or traversing the parking lot of the store where the advertisement is placed. Inside a store poses similar concerns as most stores have at least fifteen aisles reducing the likelihood that an interested consumer might see the advertisement.

Also, traditionally entrances to high pedestrian traffic venues have been the place that black mats where placed without thought to capture an advertising audience. Additionally, there has been resistance to such an entryway advertisement due to competition concerns, for example, advertising other non-related product to the property owners' focus. To address such concerns in one embodiment each property owner with specific parameters are recorded, such as only family friendly ads, or no competitive ads, or only ads for products that the property sells and so on. In one embodiment, these parameters are stored in a database in one or more records incorporated with or associated with the database records for the property owner. In one embodiment, the parameters are included in property owner criteria that comprise at least one identifier representing advertising materials that correspond to a type of business and/or product. Therefore, not only does the property owner achieve advertisement stability but the advertiser also does not have to expend resources to approach owners without any desire to allow such advertisement or allows advertisers to utilize resources to approach owners that have a desire to allow such advertisement.

In one embodiment, sound is added to the advertisements when people are near or positioned on a particular area of the advertisement or the ability to text a users phone when approaching the advertisement are provided to direct an interested consumer to view the advertisement. Vertical props, such as kiosks, cars, and so on, can also be used to direct the attention of the interested consumer. The advertisements themselves can be sized or customized to fit in the available ground space, although for simplicity or consistency some standard sizes may be used. Also, the advertisement material are also tailored to be compatible with the type of grounds, e.g., concrete, wood, tile, painted flooring, and so on, along with the type of adhesive so as to not affect the quality of the flooring. Also, the advertisement does not obstruct the ground space, e.g., the entryway or pathway.

Figure 10:
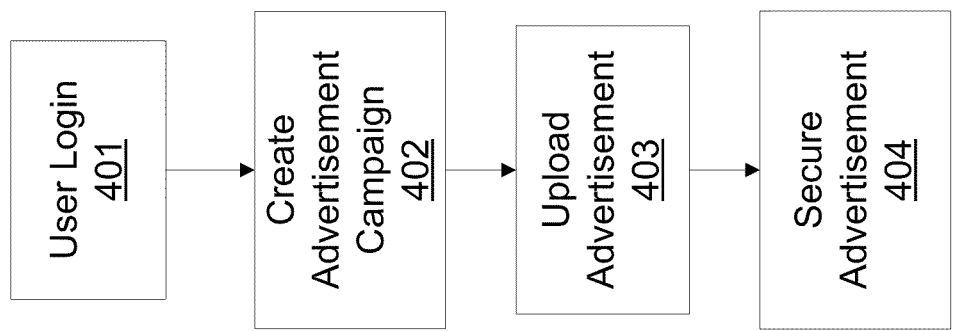
FIG. 10 is a flow diagram of a further process in accordance with aspects of the invention.

Referring now to FIG. 10, the process begins with an advertiser or user creating a login and password or if the user has already established on, the user logs in to a server directly or via a web or direct interface from the user's computing device, such as a mobile phone or computer (401). After login, a user starts creating an advertising campaign (402). For example, in one embodiment, a user is able to browse and/or select locations for the placement of an advertisement by accessing a database associated with the server. The database includes a plurality of database records that has locations, sizes of locations, sizes of advertisements, duration of placement and past, present and future ad placements calendars. Locations can be selected based on regions, markets, state, city or demographics particularly relevant to the user or the user's target advertising audience. In one embodiment, the server provides searching of the database records by accepting queries from the user's or client's computer to provide a candidate list of locations based on the search query provided. Additional fillers or limits on the provided list or via the initial search query or browsing can also be provided to narrow or focus the location lists.

A user can also designate a particular advertisement size which is correlated with the database records by the server to identify locations that accommodates the advertisement size. Some locations have set sizes or can be customized and thus the user can select a predetermined size or provide a customized size upon selection of a particular location.

In one embodiment, a user browse selected locations that conform to the user's selected advertisement sizes and/or duration. As such, the database provides a set of records to be displayed to the user in which the records contain the selected locations with corresponding sizes and/or duration that match the selected sizes and/or duration. In one embodiment, multiple durations being days, weeks, months, quarters, yearly for example are provided.

After selecting a location along with a size and/or duration, a user uploads an advertising image for the selected location (403). In one embodiment, the user can build a customized advertisement campaign by changing images for a particular or recurring duration.

At any time throughout the process, a user upon selecting at least one location along with identifying a duration and/or size or confirming a default duration and/or size, the user can obtain pricing for that location for that duration and/or size along with any additional fees and charges that may apply. In one embodiment, the server accesses a build quotation module that provides records from the database and maintains the pricing for the records associated with each location stored in the database. In one embodiment, the pricing information is based on the cost of re-selling a right to use a leased portion of the ground-surface area of the entryway. Providing the ability to view pricing information at any time during the process assists the user to build and plan their advertising budgets. In one embodiment, pricing information further includes database records, each record associated with locations and including revenue allocation information that identifies allocation of at least a portion of revenue between the property owner and a third party entity.

Once a user confirms a selection of at least one location, the user can initiate the process of securing the locations selected and durations (404). In one embodiment, the server access a build invoice module that assists a user in creating a company profile, blocking out their selected dates and build an invoice for the user which then in one embodiment generates their contract, take a deposit via credit card or electronic check or via some other type of an agreement and provides deployment instructions. The process ends by the user logging off. In one embodiment, subsequently, e.g., upon notification by the advertisement system of the deployment/installation of the advertisement, a user can verify the installation of the advertisement by viewing pictures or videos supplied by the advertising system.

Although the invention has been described as certain embodiments, it should be recognized that the invention includes the claims and their equivalents supported by this disclosure.

What is claimed is:

1. A system for placing outdoor surface advertising on a surface, comprising:
   a plurality of physical advertising locations for placement of surface advertising, each of the plurality of physical advertising locations including at least one leasable surface area;
   at least a first server computing device comprising at least a processor and memory, interconnected with a communications network and in further communication with an electronically accessible server database including a plurality of electronic records, each electronic record comprising information concerning at least one physical advertising location including an advertising location image, and at least one additional property owner criteria associated with and further defining the properties of the at least one location, wherein the at least one additional property owner criteria at least includes the usable advertising space at the location and at least one criteria selected from the group consisting of duration of advertising time available, image data, the type of businesses proximate the at least one location, the type of advertisements appropriate for the at least one location, and the level of consumer traffic at the least one location;
   at least one monitoring device for determining the level of consumer traffic at each of the plurality of physical advertising locations, the at least one monitoring device interconnected to the first computing device through the communications network such that the level of consumer traffic at each of the plurality of physical advertising locations is collected in the electronic record for said physical advertising location on the first computing device;
   at least a second client computing device, comprising at least a processor and memory, adapted to interconnect with the at least first computing device through the communications network and further adapted to communicate a user query to the server database through the at least first computing device, wherein the query comprises at least one user search criteria;
   wherein the user search criteria at least includes the duration of advertisement requested, an advertising budget, and advertisement data, where the advertisement data describes features of the advertisement to be placed at a particular location selected from the group consisting of sound associated with an advertisement, vertical props, the size of the advertisement, the material used to construct the advertisement, and the attachment method used in conjunction with the advertisement;
   at least one of the first computing device and the second computing device further comprises at least one data processor adapted to correlate the user search criteria with the physical advertising location electronic records;
   wherein during the correlation the first computing device executes an audit review of the electronic records by calibrating all physical advertising locations, durations, image data, and remaining property inventory, where the audit review comprises generating a set of available property data based on the electronic records;
   wherein during the correlation the first computing device determines advertising pricing data for at least the set of available property data, where advertising pricing data at least includes information concerning the level of consumer traffic for the available property based on the electronic records;
   wherein during the correlation the first computing device executes a comparison of the user search criteria with both the property owner criteria from the set of available property data and the advertising pricing data, and transmits a set of location results based on the correlation to the at least second client computing device; and
   wherein the at least first server computing device further comprises a location selection and invoicing system incorporated into the at least first server computing device and configured to accept a location selection input from said at least second client computing device of a physical advertising location selected from the location results for use during an advertising campaign and output an invoice for securing said physical advertising location during an advertising campaign at the physical advertising location from said at least first server computing device to said at least second client computing device;
   wherein the at least first server computing device further comprises a payment acceptance system adapted to receive remote payment from the second client computing device and modify the electronic record of the physical advertising location to indicate removal from the remaining property inventory for at least the duration of advertising requested;
   at least a third property owner computing device, comprising at least a processor and memory, interconnected with the communications network, and wherein the first server computing device collates a set of advertisement campaign information on the advertising campaign including at least the duration of the advertisement and advertisement data and communicates said advertisement campaign information to the third property owner computing device, wherein the third property owner computing device places the advertisement at the physical advertising location;

at least an advertisement placement computing device, comprising at least a processor and memory, interconnected with the at least first server computing device through the communications network, and wherein the advertisement placement computing device communicates a confirmation of the placement of the advertisement on the location selection including at least image data of the placed advertisement, and wherein on receipt of such confirmation the first server computing device updates the electronic record for the physical advertising location with said confirmation and communicates said confirmation to said second client computing device and said third property owner device, and wherein the advertisement placement computing device may comprise a separate computing device or one of either the second client computing device and the third property owner device; and wherein the at least second client computing device is further configured to upload an advertising image to be incorporated into the advertising and wherein the advertisement placement computing overlays said advertising image with the image of the physical advertising location such that an overlaid image is produced, said overlaid image being accessible by the second client computing device and third property owner computing device.

2. The system of claim 1 wherein the property owner criteria comprises at least one identifier representing advertising materials that correspond to a type of business.

3. The system of claim 1 wherein the property owner criteria comprises at least one identifier representing advertising materials that correspond to a type of product.

4. The system of claim 1 wherein the space advertising includes a non-slip, thin advertising materials to be affixed to an entryway.

5. The system of claim 1 wherein the database includes at least one record that corresponds to a selected location from the location results, the at least one record comprising at least one image of the advertising material incorporated with the uploaded advertising image and affixed to the entryway of the selected location.

6. The system of claim 1 wherein the at least first server computing device is further configured to dynamically update pricing information for the location selection on a selected schedule based on at least the consumer traffic data over a recorded period.

7. The system of claim 6 wherein the pricing information is based on re-selling a right to use a leased portion of the surface area of the entryway.

8. The system of claim 7 wherein the plurality of records further comprises records associated with locations and including revenue allocation information identifying allocation of at least a portion of revenue between the property owner and a third party entity.

9. The system of claim 1 wherein the correlated criteria include at least location type, location size, advertisement size, duration of placement, timing of placement, market demographics, and price.

10. The system of claim 1, wherein:
the location results further comprise a set of flooring data for each particular location in the location results; and
the adhesive data in the advertisement property data identifies at least one adhesive that is compatible with the flooring data for a particular location.

11. The system of claim 10, wherein the flooring data comprises metadata describing flooring type selected from the group consisting of concrete, wood, tile, and painted flooring.

* * * * *